Oct. 24, 1933.     B. E. O'HAGAN     1,932,022
LIGHT SIGNAL
Filed Oct. 14, 1931
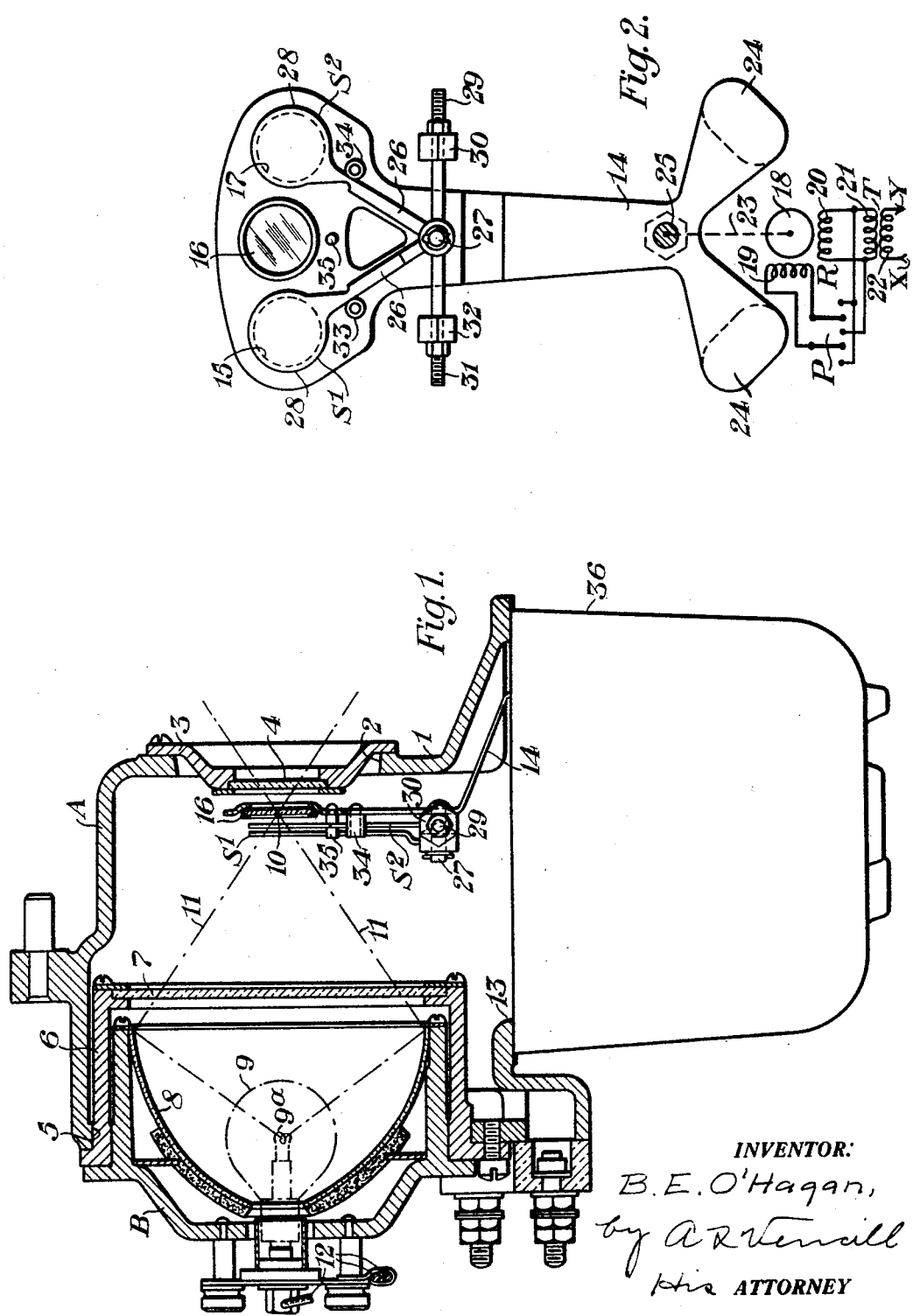
INVENTOR:
B. E. O'Hagan,
by A. R. Tencill
his ATTORNEY Patented Oct. 24, 1933

1,932,022

UNITED STATES PATENT OFFICE 1,932,022

LIGHT SIGNAL

Bernard E. O'Hagan, Swissvale, Pa., assignor to The Union Switch & Signal Company, Swissvale, Pa., a corporation of Pennsylvania Application October 14, 1931. Serial No. 568,761

10 Claims. (Cl. 177—329)

My invention relates to light signals, and particularly to light signals of the searchlight type which are capable of selectively projecting a plurality of beams of light of different colors from a single light source.

One object of my invention is to provide a light signal of the type described wherein the indication may change from caution to proceed, and vice versa, without giving a momentary flash of the stop indication.

I will describe one form of signal embodying my invention, and will then point out the novel features thereof in claims.

In the accompanying drawing, Fig. 1 is a side view, partly in section and partly in elevation, showing one form of light signal embodying my invention. Fig. 2 is a view of the spectacle arm 14 forming part of the signal shown in Fig. 1, as it appears when viewed from the left in Fig. 1.

Similar reference characters refer to similar parts in both views.

Referring to the drawing, the signal comprises a suitable casing A, the forward wall 1 of which is provided with an aperture 2. Secured to the casing adjacent the aperture 2 is a ring member 3 provided with a transparent roundel or cover glass 4 through which the signal beam is projected. The rear wall of the casing is also provided with an aperture 5, and extending into the casing through this latter aperture is a tubular member 6 which is closed at its inner end by a transparent cover glass 7. Fitting within the tubular member 6 is a removable light unit B. This light unit may be of any suitable type, and as here shown, comprises an elliptical reflector 8, and an electric lamp 9 having its filament 9ᵃ so positioned with relation to the reflector that the reflector will collect a large percentage of the light rays emitted by the lamp and cause them to converge at or near a focal point 10, as indicated by the dash lines 11. The electric lamp 9 may be supplied with current from any suitable source, not shown in the drawing, through conductors 12.

Extending upwardly into the casing A through a suitable opening 13 formed in the bottom of the casing is a spectacle arm 14 having three differently colored filters 15, 16 and 17 mounted in its upper end, as shown in Fig. 2. The spectacle arm 14 is fastened at its lower end to a pivoted shaft 25, and is capable of assuming an intermediate position in which the filter 16 is located in axial alignment with the cover glass 4 at or near the focal point 10, a right-hand position in which the filter 15 is located in axial alignment with the cover glass 4 at or near the focal point 10, and a left-hand position in which the filter 17 is located in axial alignment with the cover glass 4 at or near the focal point 10. It will be apparent that when one of the filters is located in axial alignment with the cover glass 4 at the focal point 10, the light rays passing through the focal point will pass through the filter, so that only light rays of the color which are not filtered out can emerge from the signal. Since the filters are differently colored, it follows that the signal is capable of displaying three different aspects depending upon which one of the filters is located at the focal point 10. In the practical application of a light signal embodying my invention to railway signaling, the spectacle arm 14 is biased to the vertical position by suitable means, such for example as counterweights 24 (see Fig. 2), and the filter 16 is colored red, so that when the arm occupies this position, the projected beam is red indicating "stop". The filter 17 is colored green, and the filter 15 is colored yellow, so that when the arm 14 occupies its left-hand position, the beam emitted by the signal is green, indicating "proceed", and when the arm 14 occupies its right-hand position, the beam emitted by the signal is yellow, indicating "caution".

Any suitable form of mechanism may be employed for operating the spectacle arm 14 from its intermediate position in which it is shown in the drawing, to either of its extreme positions. In the form illustrated diagrammatically in Fig. 2, this mechanism comprises an alternating current relay R of the polyphase induction type having a rotor 18 and two field windings 19 and 20. The rotor 18 is operatively connected with the shaft 25 by suitable connecting means, indicated by the dash lines 23 in the drawing, in such manner that rotation of this rotor in one direction will rotate the shaft 25 to the position in which the spectacle arm occupies its extreme left-hand position, whereas rotation of this rotor in the opposite direction will rotate the shaft 25 to the position in which the spectacle arm occupies its extreme right-hand position. The one field winding 20 of the relay R is constantly connected with a suitable source of alternating current, here shown as the primary 21 of a transformer T, the secondary 22 of which is constantly supplied with current from the terminals X and Y of a suitable source not shown in the drawing; and the other field winding 19 of the relay R is also connected with the secondary 21 of transformer T over suitable means for reversing its connections, this means, as here shown, being a manually operated pole changer P. The detailed construction and operation of a relay of the type described is well-known in the art, and for the purpose of obtaining a clear understanding of the present invention, it is sufficient to note that torque is exerted on the rotor 18 to turn it in one direction or the other depending upon the phase relations of the alternating current in the two field windings 19 and 20, and that this torque ceases when the current is cut off from one of these windings. Hence, it will be seen that by operating the pole changer P to reverse the connections to the field winding 19, the spectacle arm 14 may be made to move to one extreme position or the other, and that by operating the pole changer to the position in which the connections to the field winding 19 are broken, the spectacle arm is free to be returned to its intermediate position by the counterweights 24. It is understood, of course, that the relay R is secured to the casing A within the inclosing housing 36.

With the light signal constructed in the manner thus far described, it will be readily understood that when the pole changer P is operated to cause the signal indication to change from caution to proceed, or vice versa, as is frequently required, since the color filter 16 is located between the color filters 15 and 17, a momentary stop indication will be given as the color screen 16 passes the cover glass 4. This stop indication is undesirable because, in many instances, it is essential that the engineer of the train should apply the brakes immediately when a stop signal occurs, and it is believed that the continued recurrence of such signals might make the engineer unconsciously hesitate long enough before applying the brakes when the signal normally changes to stop, to see if the stop indication will be permanent. Furthermore, in other instances, the engineer, upon seeing the momentary stop indication, may make an unnecessary application of the brakes, thus causing unnecessary delays and undue wear to the railway equipment. In order to eliminate this momentary stop indication while the signal is changing from caution to proceed, or vice versa, I provide the signal with suitable shutter mechanism which I will now describe.

As shown in the drawing, this shutter mechanism comprises two similar shutters $S^1$ and $S^2$ each comprising an arm 26, rotatably mounted at its lower end on a stud 27, and provided at its upper end with a light impervious disk 28 which is slightly larger in diameter than the color filters 15, 16 and 17. In the practical embodiment illustrated, the stud 27 is secured to the spectacle arm 14, but, as will be pointed out more fully hereinafter, this stud may, if desired, be attached to some fixed part of the casing A or to the operating mechanism for the spectacle arm. Secured to the lower end of the arm 26 of the shutter $S^1$ is a threaded counterweight arm 29 upon which a counterweight 30 is adjustably screwed, and secured to the lower end of the shutter $S^2$ is a similar threaded counterweight arm 31 upon which a counterweight 32 is adjustably screwed. The functions of the counterweights 30 and 32 will be made clear as the description proceeds. The shutter mechanism also includes two roller studs 33 and 34 which are attached to the spectacle arm 14, and which cooperate with the arms 26 of the shutters $S^1$ and $S^2$, respectively; and a stop pin 35 which cooperates with the arm 26 of both shutters $S^1$ and $S^2$.

The operation of the apparatus as a whole is as follows: As shown in the drawing, pole changer P occupies the position in which the connections to the winding 19 of relay R are interrupted, and the spectacle arm 14 is therefore held in its intermediate position by the counterweights 24. The parts are so proportioned, and the counterweights 30 and 32 are so adjusted, that under these conditions, the shutters $S^1$ is biased by gravity to the position in which the arm 26 thereof engages the roller stop 33, and the shutter $S^2$ is biased by gravity to the position in which the arm 26 thereof engages the roller stop 34. When the shutters occupy these positions, the disk 28 of the shutter $S^1$ is located in axial alignment with the color filter 15, and the disk 28 of the shutter $S^2$ is located in axial alignment with the color filter 17 as shown in Fig. 2. The color filter 16, however, is uncovered, and the signal therefore displays a stop indication in the usual manner.

I will now assume that pole changer P is operated to move the spectacle arm 14 from the position shown in Fig. 2 to the position in which the color filter 17 is located in axial alignment with the cover glass 4. Under these conditions, the shutter $S^2$ will be moved by the counterweight 32 to the position in which the arm 26 of this shutter engages the stop pin 35, and in which the disk 28 is located substantially in axial alignment with the color filter 16. When the shutter $S^2$ occupies this latter position, the filter 17 is uncovered, and the signal will therefore display the usual proceed indication.

I will next assume that when the spectacle arm 14 occupies the position in which the signal displays a proceed indication, pole change P is reversed to cause the signal to display a caution indication. Under these conditions, as the spectacle arm moves from its extreme left-hand position to its extreme right-hand position, the shutter $S^2$ will remain in the position in which the disk 28 thereof is located in axial alignment with the color filter 16 until this filter has completely passed the cover glass 4, after which the shutter will return by gravity to the position in which it is illustrated in Fig. 2, thus preventing the momentary stop indication which would be displayed under these conditions if the shutter $S^2$ were not provided. Shortly before the color filter 15 assumes its final position in front of the cover glass 4, the counterweight 30 will move the shutter $S^1$ to the position in which the arm 26 of this shutter engages the stop pin 35, and in which the disk 28 thereof is located in axial alignment with the color filter 16, thus uncovering the color filter 15. As soon as the color filter 15 becomes uncovered, the signal will display the usual caution indication.

If when the signal is displaying a caution indication, the pole changer P is reversed to cause the signal to display a proceed indication, the shutter $S^1$ will prevent a momentary stop indication from being displayed while the filter 16 is passing the cover glass 4, in the same manner as the shutter $S^2$ prevents a momentary stop indication from being displayed while the signal indication is changing from proceed to caution.

If the pole changer P is operated to interrupt the connections to the winding 19 when the signal is displaying either a caution or proceed indication, the shutter which is located in front of the color filter 16 at the time the pole changer is operated, will be returned by gravity to the position shown as soon as the spectacle arm reaches its intermediate position, thus uncovering the filter 16. As soon as this filter becomes uncovered, the signal will display a stop indication.

As previously pointed out, the stud 27 instead of being attached to the spectacle arm 14 to move therewith, may be rigidly secured to some other part of the signal mechanism. When this is the case, the operation of the apparatus will be similar to that previously described, except that, due to the fact that the axis about which the shutters rotate is spaced from the axis about which the spectacle arm 14 rotates, there will be a slight amount of sliding friction between the roller stops 33 and 34 on the spectacle arm and the point of contact of the roller stops with the arms 26 of the shutters.

Although I have herein shown and described only one form of light signal embodying my invention, it is understood that various changes and modifications may be made therein within the scope of the appended claims without departing from the spirit and scope of my invention.

Having thus described my invention, what I claim is:

1. A light signal comprising a source of light, means for projecting a beam of light from said source, a member adapted to be moved to an intermediate and two extreme positions and provided with means for imparting a different color to said beam in each different position of said member, means for moving said member from any one to either of the two remaining positions, and means for intercepting the beam of light projected from said source while said member is being moved from one of its extreme positions to the other.

2. A light signal comprising a source of light, means for projecting a beam of light from said source, a member adapted to be moved to an intermediate and two extreme positions and provided with a plurality of color filters having different colors, said filters being so arranged that a different one of said filters is interposed in said beam in each different position of said member, means for moving said member from any one to either of the two remaining positions, and means for intercepting the beam of light projected from said source while said member is being moved from one of its extreme positions to the other.

3. A light signal comprising a source of light, means for projecting a beam of light from said source, a member adapted to be moved to an intermediate and two extreme positions and provided with a plurality of color filters having different colors, said filters being so arranged that a different one of said filters is interposed in said beam in each different position of said member, means for moving said member from any one to either of the two remaining positions, and shutter mechanism effective for intercepting the beam of light projected from said source while said member is passing its intermediate position during movement of said member from one of its extreme positions to the other.

4. A light signal comprising a source of light, means for projecting a beam of light from said source, a member adapted to be moved to an intermediate and two extreme positions and provided with a plurality of color filters having different colors, said filters being so arranged that a different one of said filters is interposed in said beam in each different position of said member, means for moving said member from any one to either of the two remaining positions, a first pivoted shutter, means effective when said member is moved from one extreme position to the other for operating said first shutter in such manner that said first shutter will intercept the beam of light projected from said source while said member is passing its intermediate position, a second pivoted shutter, and means effective when said member is moved from said other extreme position to said one extreme position for operating said second shutter in such manner that said second shutter will intercept the beam of light projected from said source while said member is passing its intermediate position.

5. A light signal comprising a source of light, means for projecting a beam of light from said source, a member adapted to be moved to an intermediate and two extreme positions, means for moving said member from any one to either of the two remaining positions; three color filters carried by said member, said filters being so disposed that a first one of said filters will be located in the beam of light projected from said source when said member occupies one extreme position, a second one of said filters will be located in the beam of light projected from said source when said member occupies its intermediate position, and a third one of said filters will be located in the beam of light projected by said source when said member occupies the other extreme position; two roller stops carried by said member; a first shutter comprising an arm rotatably mounted at one end and provided at the other end with a light impervious disk, said first shutter being biased to such position that when said member occupies said other extreme position or said intermediate position the arm of said first shutter will engage one of said roller stops and the disk thereof will be located substantially in axial alignment with said first filter; a second shutter comprising an arm rotatably mounted at one end and provided at the other end with a light impervious disk, said second shutter being biased to such position that when said member occupies said intermediate or said one extreme position the arm of said second shutter will engage the other one of said roller stops and the light impervious disk thereof will be located substantially in axial alignment with said third filter; a third stop carried by said member, means effective when said member is moved to said one extreme position for moving said first shutter to the position in which the arm of said first shutter engages said third stop and in which the disk of said first shutter is located substantially in axial alignment with said second filter, and means effective when said member is moved to said other extreme position for moving said second shutter to the position in which the arm of said second shutter engages said third stop and in which the disk of said second shutter is located substantially in axial alignment with said second filter.

6. A light signal comprising a source of light, means for projecting a beam of light from said source, a member adapted to be moved to an intermediate and two extreme positions; means for moving said member from any one to either of the two remaining positions, three color filters carried by said member, said filters being so disposed that a first one of said filters will be located in the beam of light projected from said source when said member occupies one extreme position, a second one of said filters will be located in the beam of light projected from said source when said member occupies its intermediate position, and a third one of said filters will be located in the beam of light projected by said source when said member occupies the other extreme position;

two roller stops carried by said member; a first shutter comprising an arm rotatably mounted at one end and provided at the other end with a light impervious disk, said first shutter being biased to such position that when said member occupies said other extreme position or said intermediate position the arm of said first shutter will engage one of said roller stops and the disk thereof will be located substantially in axial alignment with said first filter; a second shutter comprising an arm rotatably mounted at one end and provided at the other end with a light impervious disk, said second shutter being biased to such position that when said member occupies said intermediate or said one extreme position the arm of said second shutter will engage the other one of said roller stops and the light impervious disk thereof will be located substantially in axial alignment with said third filter; a third stop carried by said member, a first counterweight attached to said first shutter and effective when said member is moved to said one extreme position for moving said first shutter to the position in which the arm of said first shutter engages said third stop and in which the disk of said first shutter is located substantially in axial alignment with said second filter, a second counterweight attached to said second shutter and effective when said member is moved to said other extreme position for moving said second shutter to the position in which the arm of said second shutter engages said third stop and in which the disk of said second shutter is located substantially in axial alignment with said second filter.

7. A light signal comprising a source of light, means for projecting a beam of light from said source, a member adapted to be moved to an intermediate and two extreme positions, means for moving said member from any one to either of the two remaining positions; three color filters carried by said member, said filters being so disposed that a first one of said filters will be located in the beam of light projected from said source when said member occupies one extreme position, a second one of said filters will be located in the beam of light projected from said source when said member occupies its intermediate position, and a third one of said filters will be located in the beam of light projected by said source when said member occupies the other extreme position; two roller stops carried by said member; a first shutter comprising an arm rotatably mounted at one end and provided at the other end with a light impervious disk, said first shutter being biased to such position that when said member occupies said other extreme position or said intermediate position the arm of said first shutter will engage one of said roller stops and the disk thereof will be located substantially in axial alignment with said first filter; a second shutter comprising an arm rotatably mounted at one end and provided at the other end with a light impervious disk, said second shutter being biased to such position that when said member occupies said intermediate or said one extreme position the arm of said second shutter will engage the other one of said roller stops and the light impervious disk thereof will be located substantially in axial alignment with said third filter; a third stop carried by said member, means effective when said member is moved to said one extreme position for moving said first shutter to the position in which the arm of said first shutter engages said third stop and in which the disk of said first shutter is located substantially in axial alignment with said second filter, and means effective when said member is moved to said other extreme position for moving said second shutter to the position in which the arm of said second shutter engages said third stop and in which the disk of said second shutter is located substantially in axial alignment with said second filter, the parts being so proportioned that when said member is moved from said one extreme position to said other extreme position said first shutter will remain substantially in axial alignment with said second filter until after said member has passed its intermediate position and that when said member is moved from said other extreme position to said one extreme position said second shutter will remain substantially in axial alignment with said second filter until after said member has passed its intermediate position.

8. A light signal comprising a source of light, means for projecting a beam of light from said source to provide a visual indication, a member interposed in the path of said beam and having an intermediate and two extreme positions, means for imparting a distinctive characteristic to said beam in each of the three positions of said member to produce any one of three distinctive indications respectively, means for moving said member from any one to either of the two remaining positions, and means for rendering said beam ineffective to produce an indication while said member is being moved from either extreme position to the other extreme position.

9. A light signal comprising a source of light which serves to provide a visual indication, a member having an intermediate and two extreme positions, means for imparting a distinctive characteristic to said indication in each of the three positions of said member, means for moving said member from any one to either of the two remaining positions, and means for rendering the indication of said signal ineffective while said member is being moved from either extreme position to the other extreme position.

10. A signal comprising a member having an intermediate and two extreme positions, means associated with said member for imparting a distinctive indication in each of the three positions of the member, means for moving said member from any one to either of the two remaining positions, and means for preventing said member from giving any one of said indications while said member is being moved from either extreme position to the other extreme position.

BERNARD E. O'HAGAN.